No. 718,696. PATENTED JAN. 20, 1903.
J. S. CHENHALLS.
VEHICLE TIRE.
APPLICATION FILED MAR. 4, 1902.
NO MODEL.
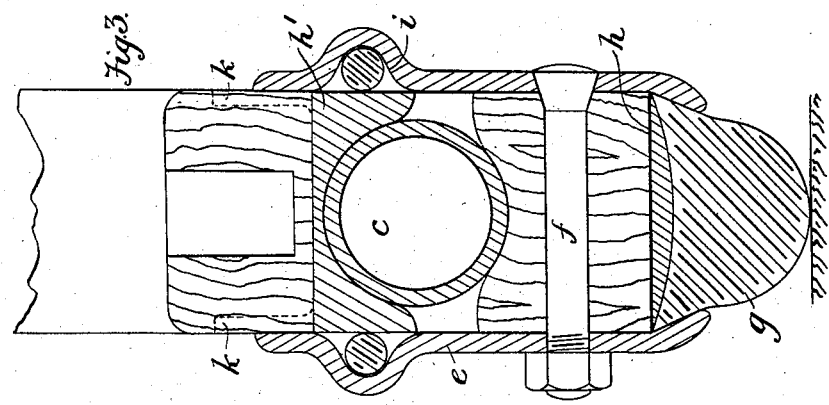
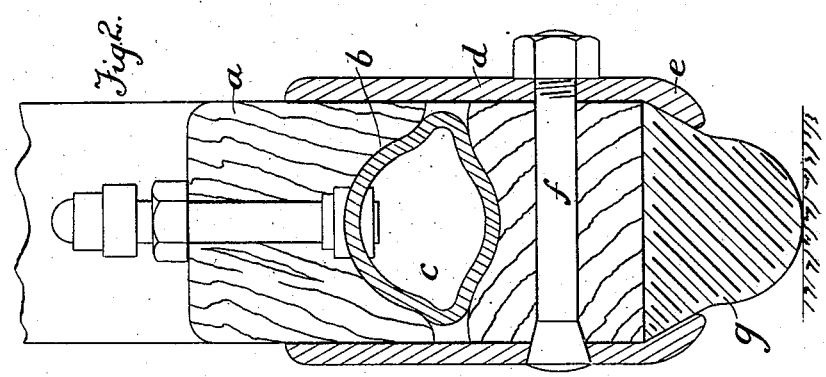
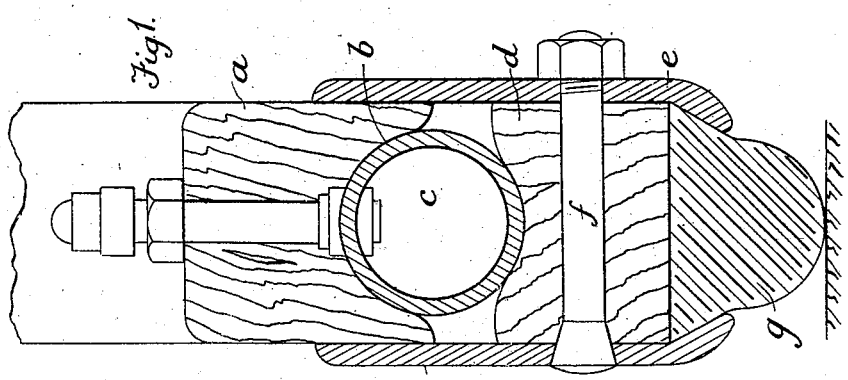
WITNESSES:
Isabella Waldron
Adelaide Claire Gleason
INVENTOR.
John Snell Chenhalls
BY Richards & Co
ATTORNEYS

UNITED STATES PATENT OFFICE.

JOHN SNELL CHENHALLS, OF PLYMOUTH, ENGLAND.

VEHICLE-TIRE.

SPECIFICATION forming part of Letters Patent No. 718,696, dated January 20, 1903.

Application filed March 4, 1902. Serial No. 96,664. (No model.)

*To all whom it may concern:*

Be it known that I, JOHN SNELL CHENHALLS, engineer, a subject of the King of England, residing at 59 Ebrington street, Plymouth, in the county of Devon, England, have invented a new and useful Tire for Vehicles, of which the following is a full, clear, and exact description, and for which I have applied for Letters Patent in Great Britain, filed and dated August 16, 1901.

This invention relates to tires, and is especially applicable to autocars, motor-cycles, and similar vehicles.

The invention relates to that class of tire in which an outer wearing-piece acts upon an air-tube which is inclosed in the rim.

The present invention consists of a particular arrangement and combination of parts in a vehicle-tire which comprises inner and outer fellies, an air-tube arranged between said fellies, and cheek-plates secured to the outer felly and riding upon the sides of the inner felly.

The invention is illustrated upon the accompanying sheet of drawings, upon which—

Figure 1 is an elevation in cross-section of a tire constructed according to my invention. Fig. 2 is a similar view showing the movement of the parts. Fig. 3 is an elevation in cross-section of a modification of the arrangement shown in Fig. 1.

The inner felly $a$ is preferably of wood and is spoked in the usual manner. It is provided with a hollow $b$, forming a seat for the air-tube $c$. Around the air-tube is arranged an outer felly $d$, also of wood, and to this felly $d$ are bolted parallel cheek-plates $e$ by means of bolts $f$, inserted transversely through the felly at intervals around the wheel. Both fellies are solid or substantial and of rectangular section, and the parallel plates $e$ and felly $d$ thus form a whole which is also rectangular in cross-section. The cheek-plates $e$ are inturned at their outer peripheries to hold a rubber or other wearing-piece $g$, having a steel or other base $h$, if desired, in position. This wearing-piece $g$ thus forms the tread of the wheel. The inner peripheries of the plates $e$ extend to the inner felly $a$ and ride upon the sides of the same, and the inner peripheries of the plates are at all times inward of the air-tube. It will thus be seen that while the inner felly $a$ is fixed relatively to and at all times concentric with the hub of the wheel, the outer felly $d$ is movable. (See Fig. 2.) The felly $d$ rides upon the air-tube $c$, which is compressed between the fellies. The cheek-plates $e$ are guided by the sides of the felly $a$. The plates $e$ must be of such a depth as to prevent water, grit, mud, and the like from entering the space between the fellies.

If desired and in order to strengthen the wheel, the felly $a$ may have a metal portion $h'$, in which the hollow $b$ is formed. (See Fig. 3.) This figure also shows grooves $i$, rolled in the plates $e$ intermediate of the depth of the same, and rubber tubing in position in said grooves. By this arrangement mud, &c., is more effectually prevented from passing into the space around the air-tube. Instead of rubber tubing rubber or leather cord or other packing material may be employed.

Metal shields $k$ (shown in dotted lines on Fig. 3) in the form of rings may, if desired, be arranged upon or recessed into the sides of the inner felly $a$ to lessen the wear of the plates $e$ upon the felly $a$.

The air-tube is preferably incased in a canvas bag and is fitted with an ordinary inflating and non-return valve. The air-tube may be endless, or it may be a butted tube of the Bourdon type.

Having thus described my invention, what I claim as such, and desire to secure by Letters Patent, is—

1. In a tire for vehicles, the combination of a solid outer felly, of parallel cheek-plates rigid and flat upon the sides of said felly, of transverse bolts through said felly holding said cheek-plates to said felly, of inturned flanges to the parallel cheek-plates, of a rubber tread gripped by said inturned flanges and secured by said cheek-plates and said transverse bolts upon said outer felly, said rubber tread being narrower than said felly, of an inner felly separated from said outer felly by an air-tube, of a metal seating for said air-tube shrunk upon said inner felly, said cheek-plates, outer felly, transverse bolts and rubber tread riding as one piece upon said inner felly and said cheek-plates extending inward of the wheel beyond the air-tube.

2. In a tire for vehicles, the combination of a solid outer felly, of parallel cheek-plates rigid and flat upon the sides of said felly, of transverse bolts through said felly holding said cheek-plates to said felly, of inturned flanges to the parallel cheek-plates, of a rubber tread gripped by said inturned flanges and secured by said cheek-plates and said transverse bolts upon said outer felly, said rubber tread being narrower than said felly, of an inner felly separated from said outer felly by an air-tube, of a metal seating for said air-tube shrunk upon said inner felly, and of metal shields inset in the sides of said inner felly and upon which the parts of said cheek-plates which are inward of the air-tube make rubbing contact.

3. In a vehicle-tire of the class described, the combination of an inner felly of wood, the rigid and parallel cheek-plates $e$, of grooves $i$ in the plates intermediate of the depth of the same, of packing in said grooves, of shields $k$ inset in the sides of the inner wooden felly, and of flat extensions of said cheek-plates $e$ inward of said grooves and bearing upon said shields on the inner felly.

In witness whereof I have hereunto set my hand in presence of two witnesses.

JOHN SNELL CHENHALLS.

Witnesses:
REGINALD HARRY WOTTON,
WILLIAM HENRY BURN.